United States Patent
Line et al.

(10) Patent No.: US 10,696,198 B2
(45) Date of Patent: Jun. 30, 2020

(54) AV AND TRANSPORT SCISSOR JACK REAR SEAT SYSTEM

(71) Applicant: Ford Global Technologies, LLC, Dearborn, MI (US)

(72) Inventors: Johnathan Andrew Line, Northville, MI (US); Spencer Robert Hoernke, Dundas (CA); Marcos Silva Kondrad, Macomb Township, MI (US); Amaury Diaz Serrano, Lathrup Village, MI (US); Daniel Ferretti, Commerce Township, MI (US); Jerry R. Brown, Northville, MI (US); Paul Iacoban, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/039,927

(22) Filed: Jul. 19, 2018

(65) Prior Publication Data

US 2020/0023757 A1   Jan. 23, 2020

(51) Int. Cl.
*B60N 2/50*   (2006.01)
*B60N 2/36*   (2006.01)

(52) U.S. Cl.
CPC ............ *B60N 2/508* (2013.01); *B60N 2/36* (2013.01); *B60N 2/502* (2013.01)

(58) Field of Classification Search
CPC ........... B60N 2/508; B60N 2/502; B60N 2/36
See application file for complete search history.

(56) References Cited

U.S. PATENT DOCUMENTS 3,853,296 A * 12/1974 Forssell ............... B60N 2/504
                                                              248/567
4,566,667 A *  1/1986 Yanagisawa .......... B60N 2/502
                                                              248/421

(Continued)

FOREIGN PATENT DOCUMENTS

EP       1529681 A1 *  5/2005  .............. B60N 2/22
EP       1632389 A2 *  3/2006  .............. B60N 2/22

(Continued)

OTHER PUBLICATIONS

Meyer, FR-1372202-A, Sep. 1964, machine translation, Espacenet (Year: 1964).*

*Primary Examiner* — David R Dunn
*Assistant Examiner* — Tania Abraham
(74) *Attorney, Agent, or Firm* — David Coppiellie; Price Heneveld LLP

(57) ABSTRACT

A seating assembly for a vehicle includes a seat base pivotally and slidably coupled with a seatback and a support frame operable between a deployed position and a collapsed position. The support frame includes a first member that is pivotally coupled with a bottom portion of the seat base and pivotally coupled to a lower frame member fixedly attached to a floor support and a second member that is slidably coupled with a bottom portion of the seat base, pivotally coupled with the first member, and slidably coupled with the floor support. The support frame also includes a kickstand pivotally coupled to the floor support and slidably coupled to the seat base. The kickstand is operable between a forward position and a rearward position, wherein the kickstand is biased to and lockable in the forward position.

17 Claims, 6 Drawing Sheets

(56) References Cited

U.S. PATENT DOCUMENTS

| | | | |
|---|---|---|---|
| 4,813,645 A * | 3/1989 | Iwami | B60N 2/502 |
| | | | 248/429 |
| 4,941,641 A | 7/1990 | Granzow et al. | |
| 5,005,894 A * | 4/1991 | Nagata | B60N 2/502 |
| | | | 248/421 |
| 5,676,424 A | 10/1997 | Winkelhake | |
| 5,950,977 A * | 9/1999 | Proksch | B60N 2/502 |
| | | | 108/145 |
| 6,997,498 B2 * | 2/2006 | Oyama | B60N 2/065 |
| | | | 296/65.05 |
| 7,029,063 B2 * | 4/2006 | Holdampf | B60N 2/206 |
| | | | 297/15 |
| 7,712,836 B2 | 5/2010 | Deml | |
| 8,561,748 B1 * | 10/2013 | Hahn | B60N 2/38 |
| | | | 180/326 |
| 9,333,885 B2 * | 5/2016 | Verhee | B60N 2/309 |

FOREIGN PATENT DOCUMENTS

| | | | | |
|---|---|---|---|---|
| FR | 1372202 A * | 9/1964 | | B60N 2/502 |
| FR | 2438203 A1 * | 4/1980 | | B60N 2/502 |
| WO | WO-9421154 A1 * | 9/1994 | | B60N 2/502 |
| WO | WO-9421487 A1 * | 9/1994 | | B60N 2/502 |

\* cited by examiner

AV AND TRANSPORT SCISSOR JACK REAR SEAT SYSTEM

FIELD OF THE DISCLOSURE

The present disclosure generally relates to a collapsible seating assembly, and more specifically to a seating assembly that includes a scissor jack rear seat system.

BACKGROUND OF THE DISCLOSURE

The flexibility of seating assemblies in vehicles is becoming more and more important. Converting seating assemblies from a passenger use position to a cargo carrying position can be cumbersome and in some cases, physically challenging, or can leave the vehicle lacking a second row of passenger seating between cargo loads. Providing a seating assembly that can easily fold down to maximize cargo space without having to remove the seats from the vehicle provides value to the consumer.

SUMMARY OF THE DISCLOSURE

According to one aspect of the present disclosure, a seating assembly for a vehicle includes a seat base pivotally and slidably coupled with a seatback and a support frame operable between a deployed position and a collapsed position. The support frame includes a first member that is pivotally coupled with a bottom portion of the seat base and pivotally coupled to a lower frame member fixedly attached to a floor support. The support frame also includes a second member that is slidably coupled with a bottom portion of the seat base, pivotally coupled with the first member, and slidably coupled with the floor support. In addition, the support frame includes a kickstand pivotally coupled to the floor support and slidably coupled to the seat base. The kickstand is operable between a forward position and a rearward position, wherein the kickstand is biased to and lockable in the forward position.

Embodiments of the first aspect of the disclosure can include any one or a combination of the following features:
- a spring assembly configured to bias the kickstand to the forward position;
- the kickstand is angled relative to the bottom portion of the seat base to optimize resistance to any submarining loads that may occur during a collision event;
- the seatback is configured to fold down flat onto the seat base to a position such that a planar extent of a rear side of the seatback is generally parallel with a floor of said vehicle;
- the seatback is slidable rearward after being folded down flat;
- the seat base is configured to move to a stowed position corresponding to the collapsed position of the support frame under the weight of the seat base and seatback; and/or
- a pivot axis defined between the kickstand and the lower frame member coincides with a pivot axis defined between the first member and the lower frame member.

According to another aspect of the present disclosure, a vehicle seating assembly includes a support frame operable between deployed and collapsed positions. The support frame includes a first member pivotally coupled with a seat base and a lower frame member and a second member slidably coupled with the seat base, pivotally coupled with the first member, and slidably coupled with a floor support. The support frame also includes a kickstand operable between a forward position and a rearward position and biased to and lockable in the forward position.

Embodiments of the second aspect of the disclosure can include any one or a combination of the following features:
- a spring assembly configured to bias the kickstand to the forward position;
- the kickstand is angled relative to a bottom portion of the seat base to optimize resistance to any submarining loads that may occur during a collision event;
- a seatback is configured to fold down flat onto the seat base to a position such that a planar extent of a rear side of the seatback is generally parallel with a floor of said vehicle;
- the seatback is slidable rearward after being folded down flat;
- the seat base is configured to move to a stowed position corresponding to the collapsed position of the support frame under the weight of the seat base and seatback; and/or
- a pivot axis defined between the kickstand and the lower frame member coincides with a pivot axis defined between the first member and the lower frame member.

According to yet another aspect of the present disclosure, a method of operating a vehicle seating assembly includes slidably moving a seatback downward toward a seat base, rotating the seatback against the seat base, unlocking a kickstand disposed below the seat base, pushing the kickstand rearward against a biasing force acting on the kickstand, and moving a support frame from a deployed position to a collapsed position by pivoting a first member downward between the seat base and a floor and by slidably moving a second member between the seat base and the floor.

Embodiments of the third aspect of the disclosure can include any one or a combination of the following features:
- a spring assembly configured to bias the kickstand to the forward position;
- the kickstand is angled relative to a bottom portion of the seat base to optimize resistance to any submarining loads that may occur during a collision event;
- the seatback is configured to fold down flat onto the seat base to a position such that a planar extent of a rear side of the seatback is generally parallel with the floor of said vehicle;
- the seatback is slidable rearward after being folded down flat; and/or
- the seat base is configured to move to a stowed position corresponding to the collapsed position of the support frame under the weight of the seat base and seatback.

These and other aspects, objects, and features of the present disclosure will be understood and appreciated by those skilled in the art upon studying the following specification, claims, and appended drawings.

DETAILED DESCRIPTION

Figure 1A:
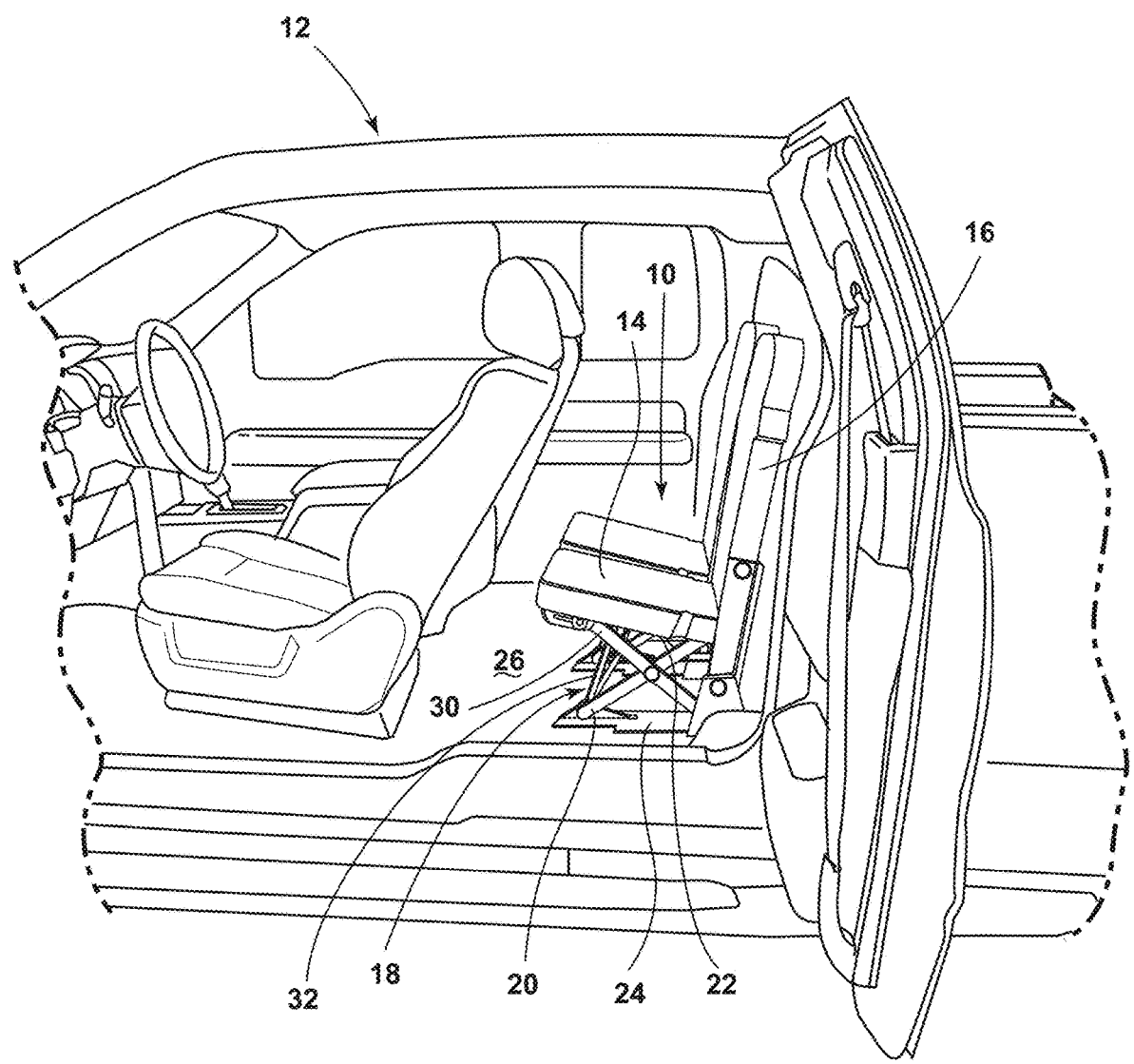
FIG. 1A is a top perspective view of a seating assembly of the present disclosure located inside a vehicle.

For purposes of description herein, the terms "upper," "lower," "right," "left," "rear," "front," "vertical," "horizontal," and derivatives thereof shall relate to the disclosure as oriented in FIG. 1A. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1B:
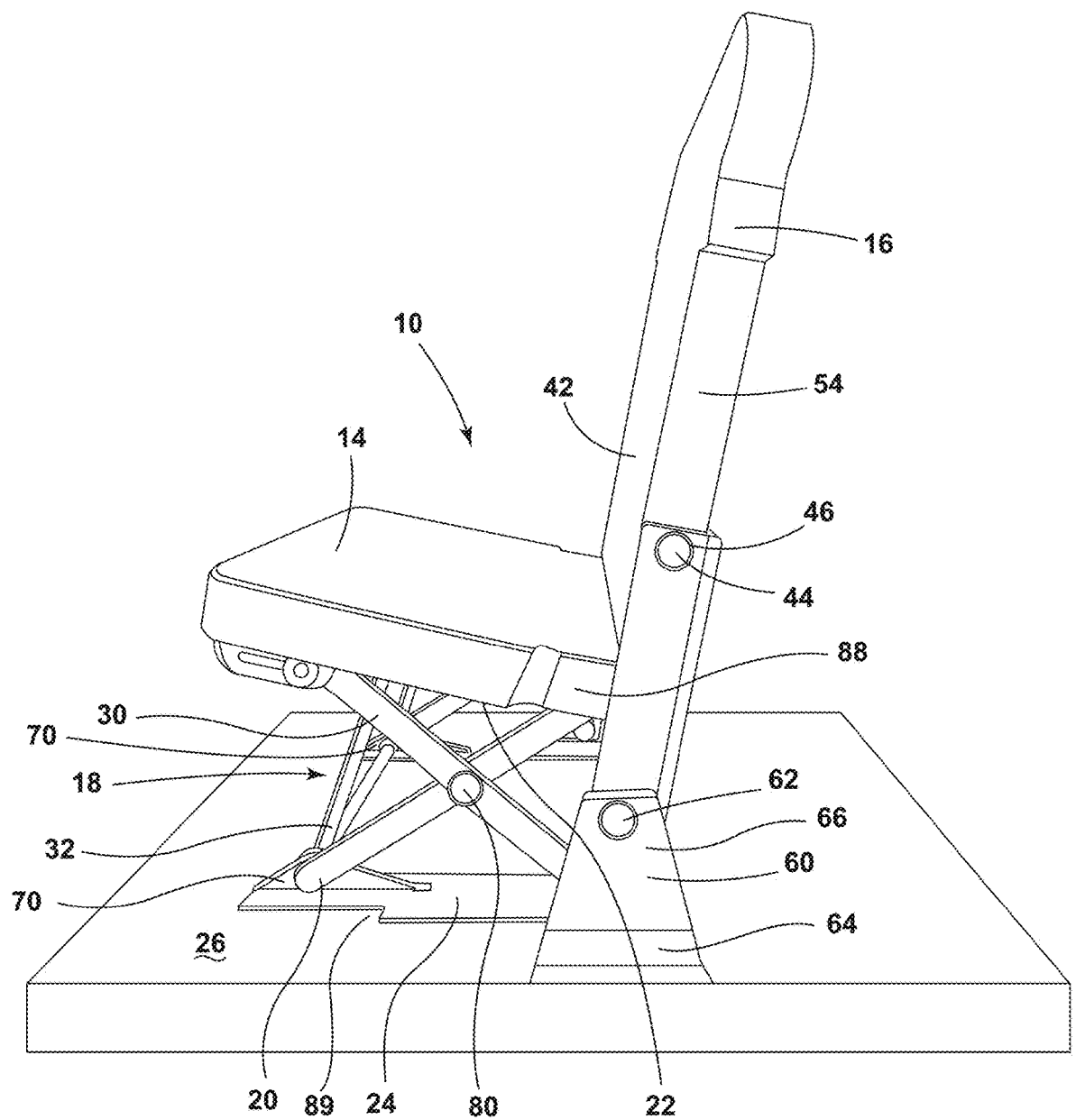
FIG. 1B is an enlarged side perspective view of the seating assembly of FIG. 1A.
Figure 3:
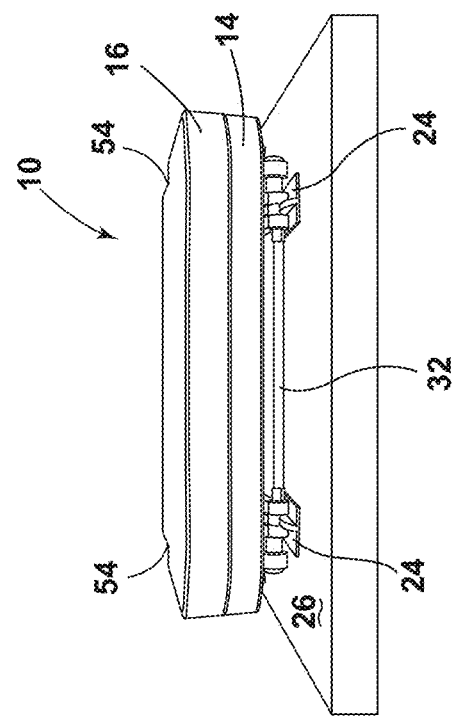
FIG. 3 is a front perspective view of the seating assembly of FIG. 2 in a folded or stowed position.

With reference to FIGS. 1A and 1B, a seating assembly 10 for a vehicle 12 includes a seat base 14 pivotally and slidably coupled with a seatback 16 and a support frame 18 operable between a deployed position (FIG. 1B) and a collapsed position (FIG. 3). The support frame 18 includes a first member 20 that is pivotally coupled with a bottom portion 22 of the seat base 14 and pivotally coupled to a lower frame member 24 fixedly attached to a floor support 26 and a second member 30 that is slidably coupled with the bottom portion 22 of the seat base 14, pivotally coupled with the first member 20, and slidably coupled with the floor support 26. The support frame 18 also includes a kickstand 32 pivotally coupled to the floor support 26 and slidably coupled to the seat base 14. The kickstand 32 is operable between a forward position and a rearward position, wherein the kickstand 32 is biased to and lockable in the forward position.

With reference again to FIGS. 1A and 1B, the seat base 14 is configured for vertical translation between an elevated position, as shown in FIGS. 1A and 1B, and a lowered position, as shown in FIG. 3. The seat base 14 is disposed above the floor support 26 and may include a planar extent that is generally parallel with the floor support 26. The seat base 14 is adjacent to the seatback 16. The seatback 16 is pivotable about an upper pivot axis 40. The upper pivot axis 40 extends through a lumbar region 42 of the seatback 16 above the seat base 14. It is generally contemplated that the seatback 16 may be positioned at any of a variety of angular positions relative to the seat base 14. A seatback pivot bracket 44 extends downwardly from the upper pivot axis 40 past the seat base 14. An upper aperture 46 of the seatback pivot bracket 44 is aligned with the upper pivot axis 40 such that the seatback pivot bracket 44 allows for rotation of the seatback 16 about the seatback pivot bracket 44. An elongate pivot rod, or individual pivot pins 50 are disposed in the upper aperture 46 of the seatback pivot bracket 44 and the upper pivot axis 40. In addition, the seatback 16 is laterally translatable relative to the pivot pins 50 between raised and lowered positions. Cutouts 54 in the seatback 16 are configured to accommodate the seatback pivot brackets 44.

With reference again to FIG. 1B, a bottom portion of the seatback pivot bracket 44 is operably coupled to a floor bracket 60. The floor bracket 60 and seatback pivot bracket 44 together define a lower pivot axis 62 about which the seatback pivot bracket 44 and the seatback 16 may rotate when the seating assembly 10 is moving to the stowed position. The stowed position is set forth in more detail herein. The floor bracket 60 is fixedly coupled to the floor support 26 of the vehicle 12. As shown, the floor bracket 60 includes a wider base 64 and a narrower top end 66. Notably, the first member 20, which is disposed at an angle relative to the floor support 26, is configured to rotate about a forward pivot axis at a forward bracket 70 and a rear pivot axis proximate a rear portion of the seat. However, the first member 20 does not slide relative to the forward bracket 70, the seat base 14, or the seat bracket. The second member 30, however, is configured to rotate and slide relative to the bottom portion 22 of the seat base 14 and also pivot and slide relative to the floor support 26. Of the first member 20 and the second member 30, only the second member 30 both pivots and slides. In addition, notably, the first member 20 and the second member 30 are pivotally coupled at a central pivot axis 80. The central pivot axis 80 is generally located at a mid-portion of both the first member 20 and the second member 30. The kickstand 32 is pivotally coupled to the floor support 26 and slidably coupled to the seat base 14. The kickstand 32 is configured to move from the rearward position to the forward position when the seat base 14 is moved to the use position. The kickstand 32 may be biased to the forward position via a spring assembly disposed proximate the forward brackets 70. In addition, the kickstand 32 may be lockable in the forward position to keep the seat base 14 from collapsing under the weight of a passenger. The kickstand 32 is specifically configured to be placed at an angle relative to the seat base 14. The angle of the kickstand 32, when in the forward position, is such that it prevents or minimizes any submarining effects that a passenger may have on the seat base 14 during a forward collision event. It is generally contemplated that the kickstand 32 may be angled at an angle similar to the angle of the seatback 16 relative to the floor support 26. Accordingly, the kickstand is placed at an angle parallel with the direction of forces applied to the seat base 14 and ultimately to the kickstand 32 during a forward collision event of the vehicle.

Figure 2:
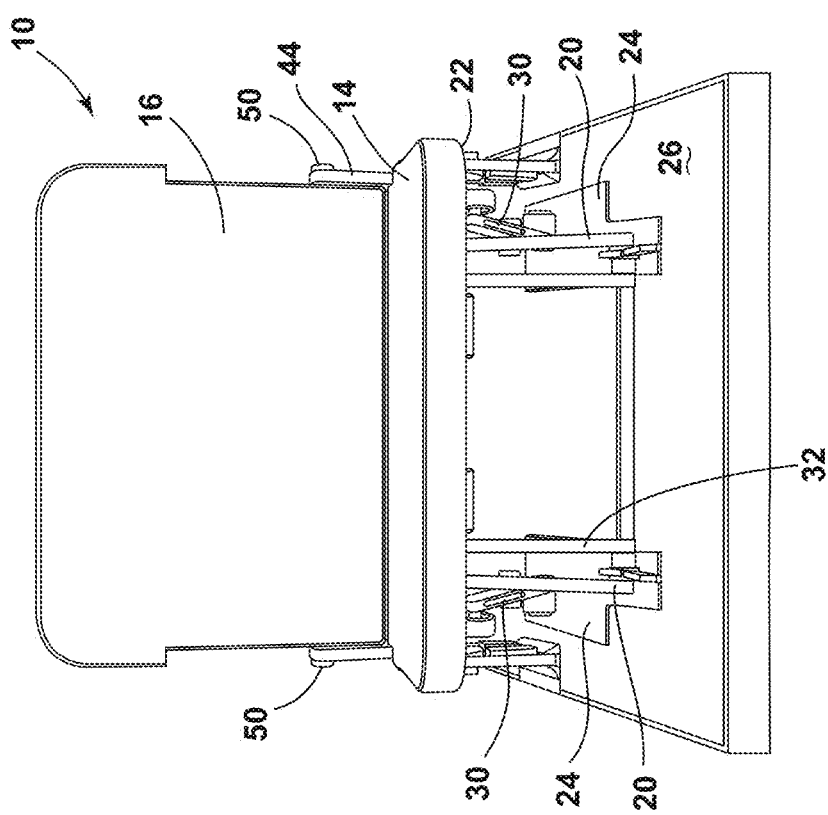
FIG. 2 is a front perspective view of a seating assembly of the present disclosure in an upright or use position.

With reference to FIGS. 2 and 3, the seating assembly 10 is movable between the use position and the stowed position. The use position corresponds to a deployed position of the support frame 18 and the stowed position corresponds to a collapsed position of the support frame 18. The cutouts 54 of the seatback 16 are configured to accommodate the seatback pivot brackets 44 when the seatback 16 is moved to the lowered position. In addition, the seat base 14 includes rear cutouts 88 (FIG. 1B) configured to accommodate the floor bracket that is fixedly attached to the floor support 26. As shown in FIG. 3, when the seating assembly 10 is in the fully stowed position, additional room for cargo is available within the vehicle 12. In addition, the lower frame members 24 disposed on each side of the seating assembly 10 include forward cutouts 89 (FIG. 1B) thereby minimizing the overall footprint of the seating assembly 10.

Figure 5:
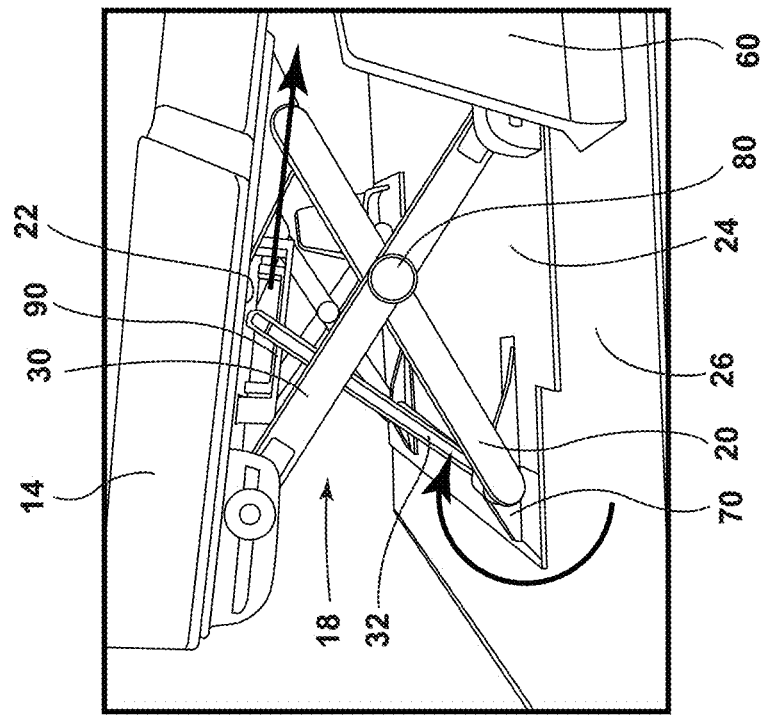
FIG. 5 is a side perspective view of the support frame of FIG. 4 during movement to the stowed position.
Figure 4:
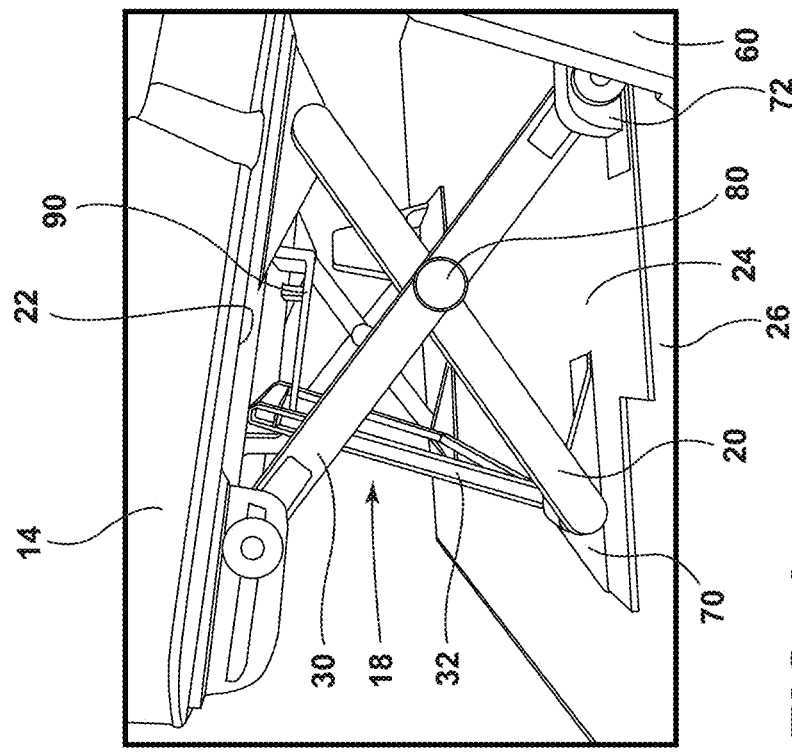
FIG. 4 is a side perspective view of a support frame of a seating assembly of the present disclosure.

With reference now to FIGS. 4 and 5, the seating assembly 10 is maintained in the use position by the kickstand 32. An upper portion of the kickstand 32 is retained in rails 90. The kickstand 32, as previously noted, may be spring-biased by clock springs disposed proximate the forward floor brackets 60. The kickstand 32 maintains the relationship of the first member 20 relative to the second member 30. When a passenger desires to move to the stowed position, the user may pull a lever that is operably coupled with an upper portion of the kickstand 32 and which draws the kickstand 32 rearward, or may simply apply a pressure to the kickstand 32 that overcomes the spring bias. More specifically, a user could apply force to the kickstand 32, for example by way of the foot of the user, which overcomes the spring bias and which results in the seat base 14 collapsing downward such that the support frame 18 moves to the collapsed position. Notably, as can be seen here, only the second member 30 is slidable relative to both the seat base 14 and a rearward bracket 72 coupled with the floor brackets 60.

Figure 7:
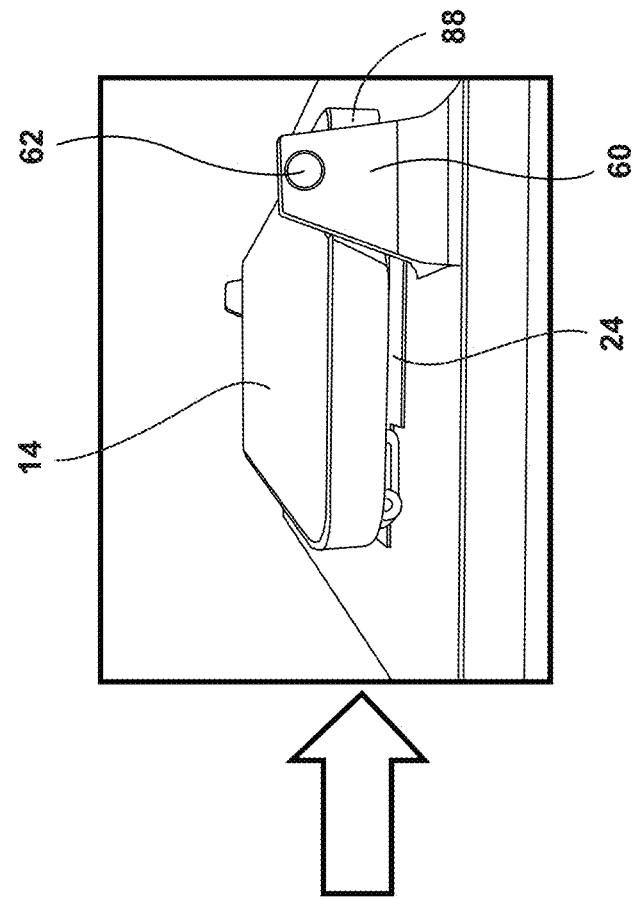
FIG. 7 is a side perspective view of a seating assembly of the present disclosure without a seatback in a folded or stowed position.
Figure 6:
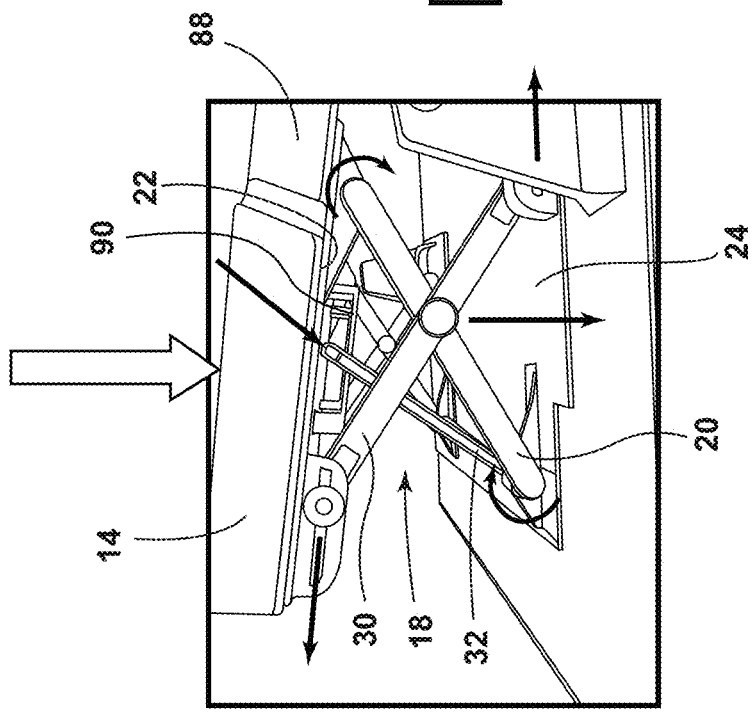
FIG. 6 is another side perspective view of the support frame of FIG. 4 during movement to the stowed position.
Figure 8:
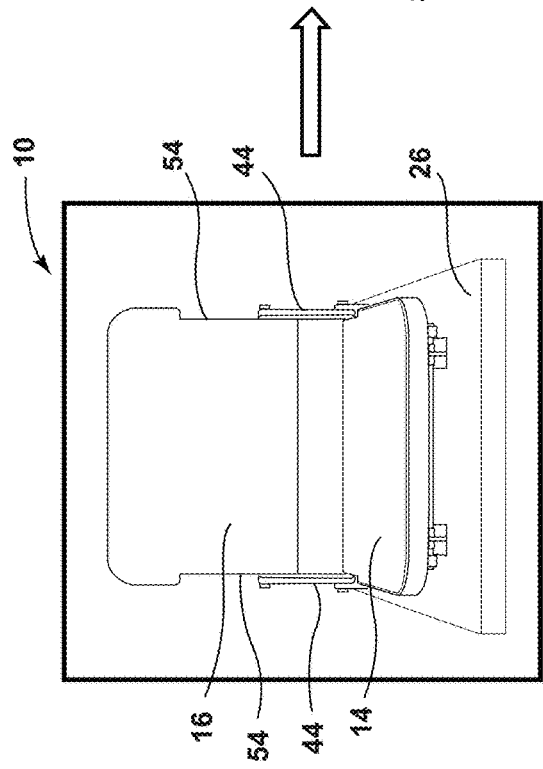
FIG. 8 is a front perspective view of a seating assembly of the present disclosure in an upright or use position.

With reference to FIGS. 6 and 7, movement from the use position to the stowed position is shown. To move the seating assembly 10 from the use position to the stowed position, a user applies force against the kickstand 32 so that the kickstand 32 rotates to the rearward position. As the kickstand 32 rotates to the rearward position, the first member 20 rotates relative to the forward support bracket and the rear seat bracket. At the same time, the second member 30 rotates and slides relative to the seat base 14 and to the floor support bracket. This movement results in the support frame 18 moving to the collapsed position and the seat base 14 moving to the stowed position. An underside of the seat base 14 may include cavities or openings on an underside thereof to accommodate the first member 20 and the second member 30, as well as the kickstand 32. As shown in FIG. 7 (which has the seatback 16 removed), the seat base 14 nearly completely conceals the first member 20, the second member 30, and the kickstand 32. Also, the bottom side of the seat base 14 is nearly abutting or abutting the lower frame member 24.

Figure 9:
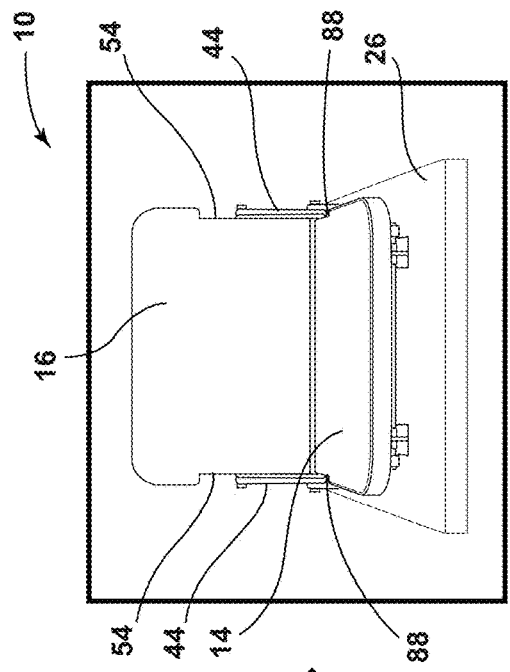
FIG. 9 is a front perspective view of the seating assembly of FIG. 8 transitioning to a stowed position.
Figure 10:
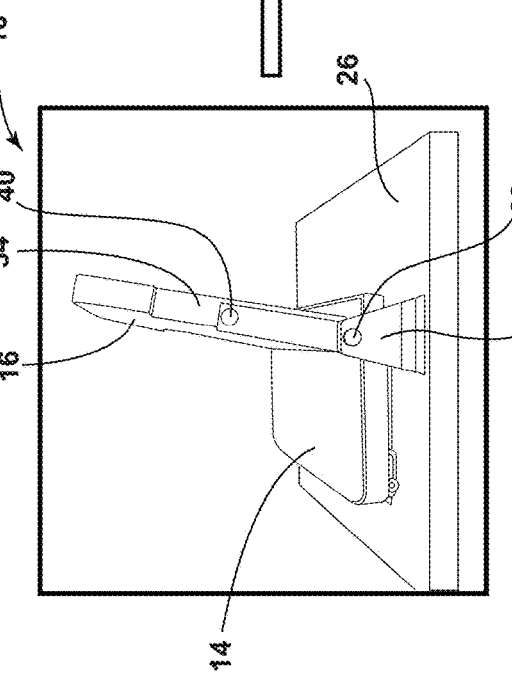
FIG. 10 is a side perspective view of the seating assembly of FIG. 8 transitioning to a stowed position.
Figure 11:
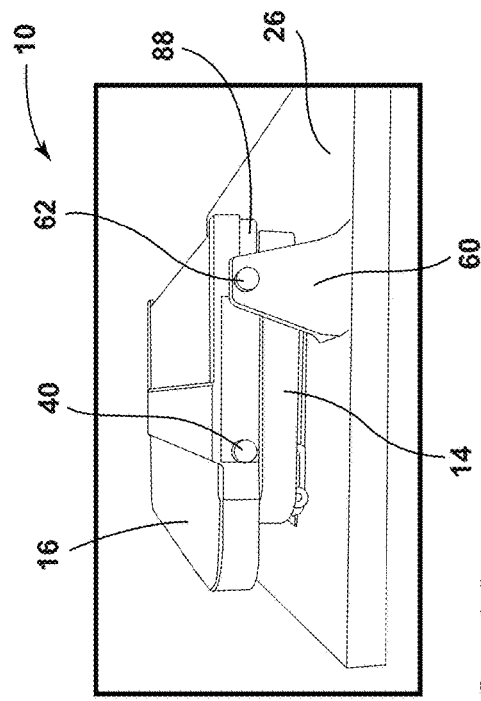
FIG. 11 is a side perspective view of the seating assembly of FIG. 8 transitioning to a stowed position.

With reference now to FIGS. 8-11, the seatback 16 is slid down relative to the seatback pivot brackets 44 with the cutouts 54 accommodating such movement (FIG. 9). The seatback 16 is then rotated such that a planar extent of the seatback 16 is in abutting contact and parallel with a planar extent of a top surface of the seat base 14. The seating assembly 10 is now in the stowed position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly for a vehicle comprising:
   a seat base pivotally and slidably coupled with a seatback; and
   a support frame operable between a deployed position and a collapsed position, the support frame comprising:
   a first member that is pivotally coupled with a bottom portion of the seat base and pivotally coupled to a lower frame member fixedly attached to a floor support;
   a second member that is slidably coupled with the bottom portion of the seat base, pivotally coupled with the first member, and slidably coupled with the floor support; and
   a kickstand pivotally coupled to the floor support and slidably coupled to the seat base, the kickstand being operable between a forward position and a rearward position, wherein the kickstand is biased to and lockable in the forward position, wherein a pivot axis defined between the kickstand and the lower frame member coincides with a pivot axis defined between the first member and the lower frame member.

2. The seating assembly of claim 1, further comprising:
a spring assembly configured to bias the kickstand to the forward position.

3. The seating assembly of claim 1, wherein the kickstand is angled relative to the bottom portion of the seat base to optimize resistance to any submarining loads that may occur during a collision event.

4. The seating assembly of claim 1, wherein the seatback is configured to fold down flat onto the seat base to a position such that a planar extent of a rear side of the seatback is generally parallel with a floor of said vehicle.

5. The seating assembly of claim 4, wherein the seatback is slidable rearward after being folded down flat.

6. The seating assembly of claim 1, wherein the seat base is configured to move to a stowed position corresponding to the collapsed position of the support frame under the weight of the seat base and seatback.

7. A vehicle seating assembly comprising:
a support frame operable between deployed and collapsed positions and comprising:
a first member pivotally coupled with a seat base and a lower frame member;
a second member slidably coupled with the seat base, pivotally coupled with the first member, and slidably coupled with a floor support; and
a kickstand operable between a forward position and a rearward position and biased to and lockable in the forward position, wherein a pivot axis defined between the kickstand and the lower frame member coincides with a pivot axis defined between the first member and the lower frame member.

8. The seating assembly of claim 7, further comprising:
a spring assembly configured to bias the kickstand to the forward position.

9. The seating assembly of claim 7, wherein the kickstand is angled relative to a bottom portion of the seat base to optimize resistance to any submarining loads that may occur during a collision event.

10. The seating assembly of claim 7, wherein a seatback is configured to fold down flat onto the seat base to a position such that a planar extent of a rear side of the seatback is generally parallel with a floor of said vehicle.

11. The seating assembly of claim 10, wherein the seatback is slidable rearward after being folded down flat.

12. The seating assembly of claim 7, wherein the seat base is configured to move to a stowed position corresponding to the collapsed position of the support frame under the weight of the seat base and seatback.

13. A method of operating a vehicle seating assembly comprising:
slidably moving a seatback downward toward a seat base;
rotating the seatback against the seat base;
unlocking a kickstand disposed below the seat base;
pushing the kickstand rearward about a pivot axis defined between the kickstand and a lower frame member which coincides with a pivot axis defined between a first member and the lower frame member, against a biasing force acting on the kickstand; and
moving a support frame from a deployed position to a collapsed position by pivoting the first member downward between the seat base and a floor and by slidably moving a second member between the seat base and the floor.

14. The method of operating a vehicle seating assembly of claim 13, further comprising:
angling the kickstand relative to a bottom portion of the seat base to optimize resistance to any submarining loads that may occur during a collision event.

15. The method of operating a vehicle seating assembly of claim 13, further comprising:
folding the seatback down flat onto the seat base to a position such that a planar extent of a rear side of the seatback is generally parallel with the floor of said vehicle.

16. The method of operating a vehicle seating assembly of claim 15, further comprising:
sliding the seatback rearward after being folded down flat.

17. The method of operating a vehicle seating assembly of claim 13, further comprising:
moving the seat base to a stowed position corresponding to the collapsed position of the support frame under the weight of the seat base and seatback.

* * * * *